United States Patent [19]

Kolouch

[11] Patent Number: 5,000,875

[45] Date of Patent: Mar. 19, 1991

[54] CONDUCTIVE FILLED FLUOROPOLYMERS

[75] Inventor: Robert J. Kolouch, Vienna, W. Va.

[73] Assignee: E. I. Du Pont de Nemours and Company, Wilmington, Del.

[21] Appl. No.: 474,538

[22] Filed: Feb. 2, 1990

Related U.S. Application Data

[63] Continuation-in-part of Ser. No. 253,520, Oct. 7, 1988, Pat. No. 4,902,444, which is a continuation-in-part of Ser. No. 169,993, Mar. 18, 1988, abandoned, which is a continuation-in-part of Ser. No. 149,152, Jan. 27, 1988, abandoned, which is a continuation-in-part of Ser. No. 109,033, Oct. 16, 1987, abandoned.

[51] Int. Cl.$^5$ ............................................. H01B 1/06
[52] U.S. Cl. .................................. 252/511; 252/518; 252/516; 252/519; 252/521; 252/62.3 T; 524/495; 524/496; 524/431; 524/432; 524/433; 524/437; 524/443; 523/137
[58] Field of Search .............. 252/511, 502, 518, 519, 252/516, 521, 62.3 T; 523/137; 524/495, 496, 430, 431, 432, 442, 433, 437, 492, 443; 525/330.7, 326.4, 355, 356; 526/247

[56] References Cited

U.S. PATENT DOCUMENTS

| | | | |
|---|---|---|---|
| 3,676,222 | 7/1972 | Delbert | 252/502 |
| 4,064,074 | 12/1977 | Ellis | 252/511 |
| 4,157,327 | 6/1979 | Martin et al. | 260/42.27 |
| 4,318,881 | 3/1982 | Sopory | 264/105 |
| 4,468,362 | 8/1984 | Solomon | 264/127 |
| 4,482,476 | 11/1984 | Yoshimura et al. | 252/511 |
| 4,545,926 | 10/1985 | Fouts et al. | 252/511 |
| 4,624,990 | 11/1986 | Lank et al. | 525/199 |
| 4,664,846 | 5/1987 | Enjo et al. | 252/511 |
| 4,743,658 | 5/1988 | Imbalzano et al. | 525/326.4 |

FOREIGN PATENT DOCUMENTS

| | | |
|---|---|---|
| 0079589 | 5/1983 | European Pat. Off. |
| 7513957 | 5/1975 | Japan |
| 1210974 | 10/1970 | United Kingdom |

Primary Examiner—Josephine Barr
Attorney, Agent, or Firm—Donald W. Huntley

[57] ABSTRACT

Tetrafluoroethylene copolymer compositions containing conductive carbon black, graphite fiber or thermally conductive fillers have significantly increased conductivity when the tetrafluoroethylene copolymer has been treated with a fluorinating agent.

11 Claims, 1 Drawing Sheet

CONDUCTIVE FILLED FLUOROPOLYMERS

CROSS REFERENCE TO RELATED APPLICATIONS

This application is a continuation-in-part of application Ser. No. 253,520 filed Oct. 7, 1988 now U.S. Pat. No. 4,902,444, which is a continuation-in-part of application Ser. No. 169,993 filed Mar. 18, 1988, now abandoned which is a continuation-in-part of application Ser. No. 149,152 filed Jan. 27, 1988 now abandoned which is a continuation-in-part of application Ser. No. 109,033 filed Oct. 16, 1987 now abandoned.

BACKGROUND OF THE INVENTION

Conductive polymer compositions prepared by incorporating conductive particles of carbon black or graphite are well known in the art. The polymers so prepared include thermoplastics, elastomers, thermosets and blends thereof. (See e.g., U.S. Pat. No. 4,545,926).

Carbon and graphite filled fluorocarbon compositions for electrical applications have also been known for some time. They are primarily used in preference to other conductive polymers when chemically active and/or high temperature environments are to be encountered. Applications in which conductive fluorocarbons containing carbon black and/or graphite are used include current-limiting devices e.g., self-regulating heater cable (U.S. Pat. No. 4,318,881, U.S. Pat. No. 4,624,990 and U.S. Pat. No. 4,545,926), antistatic containers for semiconductor chip processing (J6 1027842A), conductive coating compositions (U.S. Pat. No. 4,482,476, U.S. Pat. No. 4,064,074 and EP 79589), battery electrode constructions (U.S Pat. No. 4,468,362, U.S. Pat. No. 3,676,222, EP 126511A and JA 7016669 R), thermally and electrically conductive caulk (U.S. Pat. No. 4,157,327), antistatic/antifriction sheets for use in tape or film cassettes (U.S. Pat. No. 3,908,570) and conductive filaments (J 58163725A, J 75013957).

However, there are difficulties associated with adding carbon black to fluoropolymers to achieve conductivity. One difficulty is the relatively large and rapid rise that occurs in effective melt viscosity of the blend as carbon black is added. This large and rapid viscosity increase results in more difficult and time consuming processing. At low enough levels of carbon black to be of little influence on effective melt viscosity, the electrical conductivity is usually lost or in a range below that desired. Any means to reduce melt viscosity or reduce the carbon black concentration to lower levels while maintaining the desired conductivity is therefore a very desirable goal.

Higher conductivity can be obtained with graphite fibers as filler instead of carbon black. For example, U.S. Pat. No. 4,163,742 uses 5-50 weight percent graphite fibers and obtains resistivity in the range 0.03 to 6.8 ohm-cm. It is also known that fillers with high thermal conductivity can be added to give a polymer blend with increased thermal conductivity as compared with the unfilled polymer.

Compositions with high electrical conductivity can be used for electromagnetic shielding, as in computer cable, semiconductor chip protection, and satellite components. Compositions with high thermal conductivity can be used in articles such as heat exchanger tubing and heater cable jackets.

SUMMARY OF THE INVENTION

The present invention relates generally to melt processible perfluorinated tetrafluoroethylene copolymers and terpolymers which have been treated with a fluorinating agent to remove unstable end groups and then blended with electrically conductive carbon black to produce a conductive or statically dissipative composite. Conductive carbon black blended with these fluorinated fluoropolymers results in a composite that sustains significantly lower electrical resistivity and effective melt viscosity than a corresponding formulation using a nonfluorinated version of the melt processible tetrafluoroethylene copolymer.

Similarly, graphite fibers blended with these fluorinated fluoropolymers result in a composite that provides significantly lower electrical resistivity than a corresponding formulation using a nonfluorinated version of the melt processible tetrafluoroethylene copolymer.

Further, thermally conductive fillers blended with these fluorinated fluoropolymers result in a composite that provides surprisingly higher thermal conductivity than a corresponding formulation using a nonfluorinated version of the melt processible tetrafluoroethylene copolymer.

DETAILED DESCRIPTION OF THE INVENTION

The tetrafluoroethylene copolymers useful herein are those that are melt processible and are referred to in the art as perfluorinated. Representative ethylenically unsaturated comonomers useful herein that are copolymerizable with tetrafluoroethylene are represented by the formula:

wherein $R_1$ is $-R_f$, $-R'_f-X$, or $-O-R_f$ or $-O-R'_f-X$ in which $R_f$ is a perfluoroalkyl radical of 1-12 carbon atoms, $R'_f$ is $-(CF_2)_n-$, where n=1-12, or the same diradical containing ether oxygen, and X is H or Cl;

Specific copolymerizable fluorinated ethylenically unsaturated comonomers include hexafluoropropylene; perfluoro(methyl vinyl ether); perfluoro(n-propyl vinyl ether); perfluoro(n-heptyl vinyl ether); 3,3;4,4,5,5,6,6,6-nonafluorohexene-1; 3-hydrohexafluoropropyl vinyl ether; or mixtures thereof, such as a mixture of hexafluoropropylene and perfluoro(propyl vinyl ether). Preferably the comonomers are selected from perfluoro(alkyl vinyl ethers) of the formula $R_f-O-CF=CF_2$ or from perfluoroolefins of 3-6 carbons.

Comonomer content can range from 0.5 mole percent up to about 20 mole percent, and more than one comonomer can be present. Longer comonomer chains do not require as much mole % incorporation to provide melt processibility as smaller comonomer chains.

During the polymerization of these monomers, a variety of chemically unstable end groups form on the polymer chains. These can be carboxamides, carboxylic acid, acid fluorides, hydrides, $CH_2OH$, etc. They result from the use of initiators and chain transfer agents in polymerization and from competing side reactions. The end groups are quantitatively determined using infrared analysis.

It has been known for some time (GB 1210794, Ref. 3) that by contacting high molecular weight solid fluorocarbon polymers in the absence of oxygen with a source of fluorine radicals such as fluorine gas, that the radicals react with unstable end groups of the main polymer chain and convert them to a more chemically stable form.

It has now been discovered that these copolymers treated with a fluorinating agent, in addition to being more chemically unreactive, are, when blended with an electrically conductive carbon black or graphite fiber, much more conductive than their nonfluorinated counterparts at an equivalent filler loading. This behavior is observed with different conductive carbon blacks and with tetrafluoroethylene copolymers of widely varying molecular weight. In the case of blends with electrically conductive carbon black, filled copolymers made with fluorinated polymer have higher melt flow number than their nonfluorinated counterparts.

Similarly, when the fluorinated copolymers are treated with a fluorinating agent and filled with a thermally conductive filler, they are more thermally conductive than their nonfluorinated counterparts.

The degree of fluorination has been found to govern the degree of the improvement herein. For a high degree of effectiveness; i.e., conductivity and high melt flow, fluorination can be carried out until the unstable end group content is reduced to less than 6 end groups of $-CH_2OH$, $-CO_2H$, $-CO_2CH_3$, and $-COF$ per $10^6$ carbon atoms in the copolymer chain. Generally speaking, the benefits of this invention are seen even when as many as 70 such end groups per $10^6$ carbon atoms are present. Procedures for fluorination and tests for determining the number of unstable end groups are set forth in U.S. Pat. No. 4,743,658 to Imbalzano et al. Ordinarily fluorination is carried out by using fluorine gas mixed with nitrogen.

A wide variety of fluorinating agents is useful to prepare the compositions claimed herein.

Various fluorinating agents may be suitable, depending on the end groups present. Some fluorinating agents are listed in Kirk-Othmer *Encyclopedia of Chemical Technology*, Volume 10, Third Edition, pp. 832-835, and in Sheppard and Sharts, *Organic Fluorine Chemistry*, W. A. Benjamin, N.Y., 1969, pp. 56-59, 74-77, 124-127, and 163-179. While metal fluorides are fluorinating agents under suitable conditions, their use is for some purposes less attractive because they may leave inorganic residues. Volatile agents such as ClF, HF/antimony fluorides, $OF_2$, $SF_4$, and fluorine are preferred, and fluorine is most preferred.

The conductive carbon blacks useful herein are well known materials. They are described in U.S. Pat. No. 4,624,990 and in "Conductive Thermoplastic Composites", Rubber World, November 1955, pp. 30 et seq. The carbon black in particulate form is melt blended with the copolymer. The amount of carbon black added is generally between 1 and 20 weight percent of blend, preferably between 1 and 10 weight percent, and most preferably between 1 and 6 weight percent. This amount is sufficient to provide good conductivity to the blend and surprisingly, it does not increase the melt viscosity excessively.

Similarly graphite fibers are well known, as are other fillers which assist with increasing thermal conductivity, e.g., metal powders and granules, metal oxides such as iron oxide, zinc oxide, aluminum oxide and magnesium oxide, and silicon carbide. While the dimensions of the fibers are not critical, it is desirable that the average length be at least 2 mm, preferably 2-30 mm. Fiber less than 2 mm long tend to result in moldings of less strength and lower conductivity than longer fibers. The fibers preferably have a length/diameter ratio of at least 100 and most preferably between 200 and 1500.

When the filler is graphite fiber, the amount of copolymer in the blend is 50 to 95% by weight, preferably 70 to 90%. When a thermally conductive filler is used, the amount of copolymer in the blend is 50 to 90% by weight, preferably 60 to 85%, and most preferably 70 to 80%.

Test Procedures

DC electrical resistivity was determined using a Keithley Model 617 programmable electrometer controlled and monitored by a Hewlett Packard Model 300 computer. Resistance is determined from the electrometer and the resistivity calculated from the equation $$Rho = R \times (A/L)$$

where Rho is resistivity in ohm-cm, R is resistance in ohms, A the sample cross sectional area in square cm and L the length between the electrodes on the sample. Samples are compression-molded plaques cut to strips nominally $15 \times 1.3 \times 0.1$ cm.

Electrodes on the sample are provided using silver paint (SC 20 from Micro-Circuits Co.) applied with an artist paint brush in a strip about one-half centimeter wide and several centimeters apart along the major dimension of the sample. Flat faced Hofman tubing clamps (available from Thomas Scientific) are then attached snugly to the sample over the silver paint. The electrometer leads are connected to the tubing clamps to complete the circuit for the resistance measurement.

Melt flow number (MFN) is based on the melt flow rate from a melt viscometer using a 5000 g total mass piston and weight after 5 minutes residence time at $372 \pm 1°$ C. The orifice is 0.0825 inch$\pm$0.002 inch $(0.21 \pm 0.005$ cm)diameter with a 0.315 inch$\pm$0.005 inch $(0.8 \pm 0.013$ cm) land length. A polymer charge of about 5 grams is rapidly charged into the viscometer bore with the orifice in place and the sample is compacted with the unloaded piston. Just before 5 minutes (270 seconds) after initial charging, the weight is placed on the piston. Total weight of piston and weight is 5000 grams. At exactly 5 minutes (300 seconds) the extrudate is cut and discarded. At time equal to 360 seconds the extrudate is cut and weighed. The weight of the extrudate is determined, multiplied by ten, and the calculated weight per 10 minutes is recorded as the melt flow number.

The MFN was run on the compositions as prepared in a batch mixer.

End group analysis for tetrafluoroethylene/perfluoro(propyl vinyl) ether (TFE/PPVE) copolymer is done on thin (0.25–0.30 mm) films molded at 350° C. using a heated platen press. For TFE/HFP copolymers, the sample film should be prepared by cold pressing of powder instead of melt pressing. The films are scanned on a Nicolet Model 5DX Fourier Transform infrared spectrometer. All operational settings used were those provided as default settings in the Nicolet control software, except for the number of scans collected before the transform is performed (40 scans vs. 10 scans in default mode).

Similarly, a film of a reference material known to have none of the end groups to be analyzed is molded and scanned. The reference absorbance spectrum is subtracted from the sample absorbance, using the interactive subtraction mode of the software. The —$CF_2$ overtone band at 4.25 micrometers is used to compensate for the thickness differences between sample and reference during this interactive substraction. The difference spectrum, in two ranges, 5.13 to 5.88 micrometers (1950–1700 wave numbers) and 2.7 to 3.45 micrometers (3700–2900 wave numbers), represents the absorbances due to the reactive end groups.

Calibration factors to allow calculation of end groups per million carbon atoms are determined from the absorbance of model compounds. The table below presents wavelengths and factors for determining end groups via the equation:

Ends/$10_6$ carbons = absorbance × CF/film thickness in mils

| End Group | Wavelength (Micrometers) | Calibration Factor (CF) |
|---|---|---|
| —COF | 5.31 | 15,000 |
| —$CH_2OH$ | 2.75 | 88,300 |
| —$CO_2H$ | 5.52 | 10,900 |
| —$CO_2CH_3$ | 5.57 | 14,500 |

The sensitivity of the analysis for —COF groups in TFE/PPVE copolymers is 2–3 groups/$10^6$ carbon atoms. This means that a measurement of zero groups/$10^6$ carbon atoms means less than 3 groups/$10^6$ carbon atoms.

EMI Shielding Effectiveness Measurement

The shielding effectiveness (SE) of the sample, a measure of attenuation of an electromagnetic wave by the sample, is determined using a 50 ohm characteristic impedance transmission line technique which subjects the sample to a normally incident plane-wave far field electromagnetic wave. The shielding effectiveness is the ratio of the power received with a sample in place to the power received without the sample in place for the same incident power. It can be expressed by the following equation:

$$SE = 10 \, log(P1/P2) \text{ in decibels (dB)}$$

or if the receiver readout device is in voltage units;

$$SE = 20 \, log(V1/V2)$$

with
P1 = power measured with sample in place
P2 = power measured without sample
V1 = voltage measured with sample in place
V2 = voltage measured without sample.

The sample holder is described in ASTM D 4935-89 and the rest of the equipment used was similar except that a tracking generator was used as a signal generator and the receiver was a spectrum analyzer both made by Hewlett Packard. The procedure was close to that taught in the ASTM procedure but the samples were not preconditioned at 50% relative humidity.

Thermal Conductivity Measurement

Thermal conductivity was determined using a DYNATECH Model C-Matic testing apparatus. Samples were 5 cm (2 inch) diameter disks nominally 1 mm (40 mils) thick. Results were obtained at 50°, 100°, and 200° C.

Composition Preparation

Electrically conductive fluoropolymer compositions were prepared in a laboratory batch mixer. The mixer was a Rheomix 3000 manufactured by Haake Bucheler Corp. controlled and driven with Haake's Rheocord 40 microprocessor controlled torque rheometer. The unit consists of a closed mixing chamber in which dual counter-rotating rotors turn at different gear ratios to provide intensive mixing. Temperature and rotor speed of the mixer are controlled by adjustment within the Rheocord and torque and melt temperature are monitored by the unit. The rotors used were the roller type. The product removed from the mixer after melt blending was in relatively large chunks, which were cut into small pieces suitable for molding and in some cases these small pieces were ground into a powder before molding.

An alternative method of preparing the fluoropolymer composition is that of U.S. Pat. No. 4,163,742.

Electrically conductive fluoropolymers were also prepared on a twin screw extruder with co-rotating screws. The ingredients were blended and fed to the extruder where they were melted, mixed, and extruded into strands which were cut into pellets for molding. The electrically conductive compositions of the invention may be prepared by single screw or twin screw extrusion, provided there is a level of mixing to provide an intimate admixture of components.

Sample Preparation of Electromagnetic (EMI) Shielding Compositions

The compositions for EMI shielding were made in a manner different than those for increasing electrical and thermal conductivity. Continuous graphite fiber tow (Hercules AS4-G) was melt coated by passing the fiber through a wire coating die on the end of a melt extruder which to some degree impregnated the tow with the fluoropolymer. The coated tow was then cut into 3mm (⅛ inch) pellets and injection molded directly on an injection molding machine into 13×13 cm (5×5 inch) plaques nominally 3mm (120 mils) thick. Samples for the shielding effectiveness measurement were then cut from the plaques using a steel die of the proper dimensions.

Graphite fiber content for the EMI shielding samples were determined by weighing 15 meters of tow and comparing the weight to that of 15 meters of the coated tow.

Molding of Conductive Carbon Filled Samples

Plaques were prepared from the compositions made in the Rheomix ™ 3000 mixer by compression molding the material in a heated 20 ton Pasedena Hydraulics Inc. hydraulically driven press maintained at 350° C. The piston diameter of the press is 4 inches (10.2 cm) and the press platens are 8 inches (20.3 cm) square. A chase with a 15×15 centimeter square opening was used to contain the polymer. The chase was nominally one millimeter thick. Aluminum foil placed on either side of the chase containing the polymer helped contain the polymer and facilitated plaque removal from the press platens. Feedstock was either ground polymer or finely cut pieces from the Rheomix. Strips for resistivity measurement about 1.3 centimeter wide and 15 centimeters long were cut from the plaques which were about 1 mm thick.

The molding cycle used to prepare the plaques was typically:
1. Charge—55 grams, press preheated to 350° C.
2. Polymer in chase in press—no pressure—10 min.
3. Low pressure—2000 pounds (907 Kg)—4 min.
4. High pressure—20,000 pounds (9072 Kg)—6 min.
5. Quench—cold water.
NOTE: These "pressures" are forces on the hydraulic cylinder. In view of the size of the cylinder and the area of the chase, 2000 pounds (907 Kg) corresponds to 57 psi (393 KPa) on the polymer.

In all the Control Examples, the copolymer employed had more than 80 unstable end groups per $10^6$ carbon atoms. In all the Invention Examples, the copolymer employed had been fluorinated until the number of unstable end groups was less than 70 per $10^6$ carbon atoms.

Injection Molding Procedure For EMI Shielding Compositions

Injection molding of plaques for EMI shielding measurements was done on a 170 g (6 oz) Van Dorn molding machine using a general purpose screw running at 60 rpm. Temperature profile went from 345° C. at the rear zone to 370° C. at the nozzle. The cycle used was 4.8 mPa (700 p.s.i). Mold temperature was a nominal 240° C. The mold produced a $13 \times 13$ cm ($5 \times 5$ inch) plaque from which the sample for measurement was cut using a steel die.

EXAMPLES

Control Example 1

A 364.8 gram charge of an unfluorinated copolymer A (tetrafluoroethylene/perfluoro(propyl vinyl ether). (This copolymer is designated TFE/PPVE. It had 97 wt. % TFE and 3 wt. % PPVE and had an MFN of 13.3 gm/ten minutes.) It had unstable end groups present in amounts substantially more than 6 per $10^6$ carbon atoms. About half the charge was melted in the mixer with control temperature set at 350° C. and rotor speed at 15 rpm. When this polymer was molten, 15.2 grams of conductive carbon black (DJ-600 Ketjenblack) was added to the mixing bowl and the plunger lowered to force the carbon into the melt. After the carbon appeared to be well distributed in the melt, the remainder of the polymer charge was added. The rotor speed was held between 15 and 30 rpm until the melt temperature reached 340° C. The rotor speed was then increased to 60 rpm for 5 minutes at the end of which the melt temperature was 360°. The rotor was stopped and the blend removed from the mixer.

Invention Example 1

About half of a 364.8 gram charge of the same TFE/PPVE copolymer A except that it had been fluorinated until the unstable end group content was less than 6 per $10^6$ carbon atoms, was melted in the mixer with control temperature set at 350° C. and the rotor speed at 15 rpm. When this polymer was molten, 15.2 grams of conductive carbon black (Ketjenblack DJ-600) was added to the mixing bowl and the plunger lowered to force the carbon into the melt. After the carbon appeared to be well distributed in the melt, the remainder of the polymer was added. The rotor speed was held between 15 and 30 rpm until the melt temperature reached 330° C. The rotor speed was then increased to 60 rpm for 5 minutes at the end of which the melt temperature was 348°. The rotor was stopped and the blend removed from the mixer.

Control Example 2

About half of a 372.4 gram charge of unfluorinated TFE/PPVE copolymer B pellets (3 wt % PPVE, MFN=1.77) was melted in the mixer with control temperature set at 350° C. and the rotor speed at 15–45 rpm. When this polymer was molten, 7.6 grams of conductive carbon black (Ketjenblack DJ-600) was added to the mixing bowl and the plunger lowered to force the carbon into the melt. After the carbon appeared to be well distributed in the melt, the remainder of the polymer was added. The rotor speed was held between 15 and 45 rpm until the melt temperature reached 328° C. Rotor speed was then increased to 60 rpm for 16 minutes at the end of which the melt temperature was 352°. The rotor was stopped and the blend removed from the mixer.

Invention Example 2

About half of a 374.2 gram of the same TFE/PPVE copolymer B as in Control Example 2 except that it had been fluorinated until the number of unstable end groups was less than $6 \times 10^6$ carbon atoms was melted in the mixer with control temperature set at 350° C. and rotor speed at 15–47 rpm. When the polymer was molten, 7.6 grams of conductive carbon black (Ketjenblack DJ-600) was added to the mixing bowl and the plunger lowered to force the carbon into the melt. After the carbon appeared to be well distributed in the melt, the remainder of the polymer was added. The rotor speed was held between 15 and 45 rpm until the melt temperature reached 344° C. Rotor speed was then increased to 60 rpm for 16 minutes at which time the temperature was 373° C. The rotor was stopped and the polymer blend removed from the mixer.

Control Example 3

About half of a 372.4 gram charge of unfluorinated TFE/PPVE copolymer C (3 wt % PPVE, MFN=26.6) pellets was melted in the mixer with control temperature set at 350° C. and rotor speed at 15 rpm. When the polymer was molten, 7.6 grams of conductive carbon black (Ketjenblack DJ-600) was added to the mixing bowl and the plunger lowered to force the carbon into the melt. After the carbon appeared to be well distributed in the melt, the remainder of the polymer was added. The rotor speed was 15 rpm until the melt temperature reached 326° C. Rotor speed was then increased to 60 rpm for 2.5 minutes at which time the temperature was 345° C. The rotor was stopped and the blend removed from the mixer.

Invention Example 3

About half of a 372.4 gram charge of the same TFE/PPVE as in Control Example 3 (Copolymer C) except that it had been fluorinated until the number of unstable end groups was below 6 per $10^6$ carbon atoms was melted in the mixer with control temperature set at 350° C. and rotor speed 15 rpm. When the polymer was molten, 7.6 grams of conductive carbon black (Ketjenblack DJ-600) was added to the mixing bowl and the plunger lowered to force the carbon into the melt. After the carbon appeared to be well distributed in the melt, the remainder of the polymer was added. The rotor speed was 15 rpm until the melt temperature reached 320° C. Rotor speed was then increased to 60 rpm for 6 minutes at which time the temperature was 343° C. The rotor was stopped and the blend removed from the mixer.

Control Example 4

About half of a 364.8 gram charge of the unfluorinated TFE/PPVE pellets used in Control Example 1 was melted in the mixer with control temperature set at 350° C. and rotor speed at 15 rpm. When the plymer was molten, 15.2 grams of conductive carbon black (Vulcan XC-72) was added to the mixing bowl and the plunger lowered to force the carbon into the melt. After the carbon appeared to be well distributed in the melt, the remainder of the polymer was added. The rotor speed was at 15 rpm until the melt temperature reached 325° C. Rotor speed was then increased to 75 rpm for 6 minutes at which time the temperature was 366° C. The rotor was stopped and the blend removed from the mixer.

Invention Example 4

About half of a 364.8 gram charge of the fluorinated TFE/PPVE copolymer used in Invention Example 1 was melted in the mixer with control temperature set at 350° C. and rotor speed at 15 rpm. When the polymer was molten, 15.2 grams of conductive carbon black (Vulcan XC-72) was added to the mixing bowl and the plunger lowered to force the carbon into the melt. After the carbon appeared to be well distributed in the melt, the remainder of the polymer was added. The rotor speed was at 15 rpm until the melt temperature reached 323° C. Rotor speed was then increased to 75 rpm for 6 minutes at which time the temperature was 356° C. The rotor was stopped and the blend removed from the mixer.

Control Example 5

About 250 grams of a 364.8 gram charge of the unfluorinated TFE/PPVE pellets used in Control Example 1 was melted in the mixer with control temperature set at 350° C. and rotor speed 15 rpm. When the polymer was molten, 15.2 grams of conductive carbon black (Black Pearls 2000) was added to the mixing bowl and the plunger lowered to force the carbon into the melt. After the carbon appeared to be well distributed in the melt, the remainder of the polymer was added. The rotor speed was 15 rpm until the melt temperature reached 322° C. Rotor speed was then increased to 75 rpm for 6 minutes at which time the temperature was 368° C. The rotor was stopped and the blend removed from the mixer.

Invention Example 5

About 250 grams of a 364.8 gram charge of fluorinated TFE/PPVE copolymer pellets used in Invention Example 1 was melted in the mixer with control temperature set at 350° C. and rotor speed 15 rpm. When the polymer was molten, 15.2 grams of conductive carbon black (Black Pearls 2000) was added to the mixing bowl and the plunger lowered to force the carbon into the melt. After the carbon appeared to be well distributed in the melt, the remainder of the polymer was added. The rotor speed was 15 rpm until the melt temperature reached 322° C. Rotor speed was then increased to 75 rpm for 6 minutes at which time the temperature was 363° C. The rotor was stopped and the blend removed from the mixer.

Control Example 6

About half of a 372.4 gram charge of unfluorinated tetrafluoroethylene/hexafluoropropylene Copolymer D (12.3 wt % HFP, MFN=6.8) was melted in the mixer with control temperature set at 330° C. and rotor speed 16 rpm. When the polymer was fully molten, 7.6 grams of conductive carbon black (Ketjenblack DJ-600) was added to the mixing bowl and the plunger lowered to force the carbon into the melt. After the carbon appeared to be well distributed in the melt, the remainder of the polymer was added. The rotor speed was increased stepwise from 16 to 75 rpm until the melt temperature reached 345° C. at which time the rotor speed was decreased to 50 rpm for 5 minutes at the end of which melt temperature was 339°. The rotor was stopped and the blend removed from the mixer.

Invention Example 6

A 372.4 gram charge of Copolymer D pellets as used in Control Example 6 except that it had been fluorinated to reduce the number of unstable end groups was melted in the mixer with control temperature set at 330° C. and rotor speed of 15 rpm. When the polymer was molten, 7.6 grams of conductive carbon black (Ketjenblack DJ-600) was added to the mixing bowl and the plunger lowered to force the carbon into the melt. After the carbon appeared to be well distributed in the melt, the rest of the polymer was added. The rotor speed was increased in steps to 75 rpm which was maintained for 6 minutes at which time the temperature was 360° C. The rotor was stopped and the blend removed from the mixer.

Control Example 7

About 250 grams of a 368.6 gram charge of the unfluorinated 5 Copolymer D pellets used in Control Example 6 was melted in the mixer with the control temperature set at 330° C. and the rotor speed at 15 rpm. When the polymer was molten, 11.4 grams of conductive carbon black (Ketjenblack DJ-600) was added to the mixing bowl and the plunger lowered to force the carbon into the melt. After the carbon appeared to be well distributed in the melt, the remainder of the polymer was added. The rotor speed remained at 15 rpm until the melt temperature reached about 298° C. The rotor speed was then increased to 60 rpm for 8 minutes at the end of which the melt temperature was 337° C. The rotor was stopped and the blend removed from the mixer.

Invention Example 7

About 250 grams of a 368.6 gram charge of the same fluorinated Copolymer D pellets used in Invention Example 6 was melted in the mixer with the control temperature set at 330° C. and the rotor speed at 15 rpm. When the polymer was molten, 11.4 grams of conductive carbon black (Ketjenblack DJ-600) was added to the mixing bowl and the plunger lowered to force the carbon into the melt. After the carbon appeared to be well distributed in the melt, the remainder of the polymer was added. The rotor speed remained at 15 rpm until the melt temperature reached about 300° C. The rotor speed was then increased to 60 rpm for 8 minutes at the end of which the melt temperature was 338° C. The rotor was stopped and the blend removed from the mixer.

Control Example 8

About 250 grams of a 353.4 gram charge of the unfluorinated TFE/PPVE pellets used in Control Example 1 was melted in the mixer with control temperature set at 350° C. and rotor speed at 15 rpm. When the polymer was molten, 26.6 grams of conductive carbon black (Vulcan XC-72) was added to the mixing bowl and the plunger lowered to force the carbon into the melt. After the carbon appeared to be well distributed in the melt, the remainder of the polymer was added. The rotor speed was at 15 rpm until the melt temperature reached 320° C. Rotor speed was then increased to 60 rpm for 7 minutes at which time the temperature was 355° C. The rotor was stopped and the blend removed from the mixer.

Invention Example 8

About 250 grams of a 353.4 gram charge of the fluorinated TFE/PPVE copolymer used in Invention Example 1 was melted in the mixer with control temperature set at 350° C. and rotor speed at 15 rpm. When the polymer was molten, 26.6 grams of conductive carbon black (Vulcan XC-72) was added to the mixing bowl and the plunger lowered to force the carbon into the melt. After the carbon appeared to be well distributed in the melt, the remainder of the polymer was added. The rotor speed was at 15 rpm until the melt temperature reached 320° C. Rotor speed was then increased to 60 rpm for 7 minutes at which time the temperature was 344° C. The rotor was stopped and the blend removed from the mixer.

Control Example 9

About 250 grams of a 342 gram charge of the unfluorinated TFE/PPVE pellets used in Control Example 1 was melted in the mixer with control temperature set at 350° C. and rotor speed at 15 rpm. When the polymer was molten, 38 grams of conductive carbon black (Vulcan XC-72) was added to the mixing bowl and the plunger lowered to force the carbon into the melt. After the carbon appeared to be well distributed in the melt, the remainder of the polymer was added. The rotor speed was at 15 rpm until the melt temperature reached 324° C. Rotor speed was then increased to 75 rpm for 6 minutes at which time the temperature was 371° C. The rotor was stopped and the blend removed from the mixer.

Invention Example 9

About 250 grams of a 342 gram charge of the fluorinated TFE/PPVE copolymer used in Invention Example 1 was melted in the mixer with control temperature set at 350° C. and rotor speed at 15 rpm. When the polymer was molten, 38 grams of conductive carbon black (Vulcan XC-72) was added to the mixing bowl and the plunger lowered to force the carbon into the melt. After the carbon appeared to be well distributed in the melt, the remainder of the polymer was added. The rotor speed was at 15 rpm until the melt temperature reached 320° C. Rotor speed was then increased to 75 rpm for 6 minutes at which time the temperature was 360° C. The rotor was stopped and the blend removed from the mixer.

Control Example 10

About 250 grams of a 304 gram charge of the unfluorinated TFE/PPVE pellets used in Control Example 1 was melted in the mixer with control temperature set at 350° C. and rotor speed at 15 rpm. When the polymer was molten, 76 grams of conductive carbon black (Vulcan XC-72) was added to the mixing bowl and the plunger lowered to force the carbon into the melt. After the carbon appeared to be well distributed in the melt, the remainder of the polymer was added. The rotor speed was at 15 rpm until the melt temperature reached 334° C. Rotor speed was then increased to 75 rpm for 6 minutes at which time the temperature was 375° C. The rotor was stopped and the blend removed from the mixer.

Invention Example 10

About 250 grams of a 304 gram charge of the fluorinated TFE/PPVE copolymer used in Invention Example 1 was melted in the mixer with control temperature set at 350° C. and rotor speed at 15 rpm. When the polymer was molten, 76 grams of conductive carbon black (Vulcan XC-72) was added to the mixing bowl and the plunger lowered to force the carbon into the melt. After the carbon appeared to be well distributed in the melt, the remainder of the polymer was added. The rotor speed was at 15 rpm until the melt temperature reached 325° C. Rotor speed was then increased to 75 rpm for 6 minutes at which time the temperature was 368° C. The rotor was stopped and the blend removed from the mixer.

Control Example 11

About 250 grams of a 368.6 gram charge of unfluorinated TFE/PPVE copolymer E (3 weight percent PPVE, MFN=15.2) pellets was melted in the mixer with control temperature set at 350° C. and rotor speed at 15 rpm. When the polymer was molten, 11.4 grams of conductive carbon black (DJ-600 Ketjenblack) was added to the mixing bowl and the plunger lowered to force the carbon into the melt. After the carbon appeared to be well distributed in the melt, the remainder of the polymer was added. The rotor speed was 15 rpm until the melt temperature reached 318° C. Rotor speed was then increased to 75 rpm for 5 minutes at which time the temperature was 361° C. The rotor was stopped and the blend removed from the mixer.

Invention Example 11

About 250 grams of a 368.6 gram charge of the same type TFE/PPVE as in Control Example 11 (Copolymer E) except that it had been fluorinated until the number of unstable end groups was below 40 per $10^6$ carbon atoms was melted in the mixer with control temperature set at 350° C. and rotor speed 15 rpm. When the polymer was molten, 11.4 grams of conductive carbon black (DJ-600 Ketjenblack) was added to the mixing bowl and the plunger lowered to force the carbon into the melt. After the carbon appeared to be well distributed in the melt, the remainder of the polymer was added. The rotor speed was 15 rpm until the melt temperature reached 317° C. Rotor speed was then increased to 75 rpm for 5 minutes at which time the temperature was 351° C. The rotor was stopped and the polymer blend removed from the mixer.

Control Example 12

About 250 grams of a 368.6 gram charge of unfluorinated TFE/PPVE copolymer E (3 weight percent PPVE, MFN=15.2) pellets was melted in the mixer with control temperature set at 350° C. and rotor speed at 15 rpm. When the polymer was molten, 11.4 grams of conductive carbon black (DJ-600 KETJENBLACK) was added to the mixing bowl and the plunger lowered to force the carbon into the melt. After the carbon appeared to be well distributed in the melt, the remainder of the polymer was added. The rotor speed was 15 rpm until the melt temperature reached 318° C. Rotor speed was then increased to 75 rpm for 5 minutes at which time the temperature was 361° C. The rotor was stopped and the blend removed from the mixer.

Invention Example 12

About 250 grams of a 368.6 gram charge of the same type TFE/PPVE as in Control Example 12 (Copolymer E) except that it had been fluorinated until the number of unstable end groups was below 60 per $10^6$ carbon atoms was melted in the mixer with control temperature set at 350° C. and rotor speed 15 rpm. When the polymer was molten, 11.4 grams of conductive carbon black (DJ-600 KETJENBLACK) was added to the mixing bowl and the plunger lowered to force the carbon into the melt. After the carbon appeared to be well distributed in the melt, the remainder of the polymer was added. The rotor speed was 15 rpm until the melt temperature reached 317° C. Rotor speed was then increased to 75 rpm for 5 minutes at which time the temperature was 356° C. The rotor was stopped and the polymer blend removed from the mixer.

Control Example 13

Unfluorinated TFE/PPVE copolymer F (3 weight percent PPVE, MFN=28.4) pellets were blended with 4.5 weight percent of KETJENBLACK DJ-600 carbon black and were melted and mixed in a co-rotating twin screw extruder. The melt was forced through a die with circular holes into strands which were water quenched and cut into pellets.

Invention Example 13

Fluorinated TFE/PPVE copolymer G (3 weight percent PPVE, MFN=20.8) pellets were blended with 4.5 weight percent of KETJENBLACK DJ-600 carbon black and melted and mixed in a co-rotating twin screw extruder. The melt was forced through a die with circular holes into strands which were water quenched and cut into pellets.

SUMMARY OF EXAMPLE PROPERTIES (FOR EXAMPLES 1-13)

The results of resistivity and melt flow number (MFN) measurements are summarized in Table I. Examination of the data for each comparison shows the dramatic reduction in resistivity for the compositions prepared from fluorinated fluorocarbon and conductive carbon black compared to those made with the nonfluorinated versions of the examples. The difference is several orders of magnitude in some cases. Significant reduction of the melt flow number is also apparent for the fluorinated versions.

Table II shows the end group analyses for the copolymers as polymerized and copolymers after fluorination.

THERMAL CONDUCTIVITY EXAMPLES

Control Example 14

About 250 g of a 285 g charge of unfluorinated TFE/PPVE copolymer G (3 weight percent PPVE, MFN=13.6; for end group analysis see Table 5) pellets was melted in the mixer with control temperature set at 350° C. and rotor speed at 15 rpm. When the polymer was molten 95 g of powdered aluminum nitride was added to the mixing bowl and the plunger lowered to force the powder into the melt. After the aluminum nitride appeared to be well distributed in the melt, the remainder of the polymer was added. The rotor speed was 15 rpm until the melt temperature reached 337° C. Rotor speed was then increased to 60 rpm for 5 minutes at which time the temperature was 347° C. The rotor was stopped and the blend removed from the mixer.

Invention Example 14

About 250 g of a 285 g charge of fluorinated TFE/PPVE copolymer H (3 weight percent PPVE, MFN=17.2; for end group analysis see Table 5) pellets was melted in the mixer with control temperature set at 350° C. and rotor speed at 15 rpm. When the polymer was molten 95 g of powdered aluminum nitride was added to the mixing bowl and the plunger lowered to force the powder into the melt. After the aluminum nitride appeared to be well distributed in the melt, the remainder of the polymer was added. The rotor speed was 15 rpm until the melt temperature reached 338° C. Rotor speed was then increased to 60 rpm for 5 minutes at which time the temperature was 347° C. The rotor was stopped and the blend removed from the mixer.

Control Example 15

About 250 g of a 285 g charge of unfluorinated TFE/PPVE copolymer G (3 weight percent PPVE, MFN=13.6) pellets was melted in the mixer with control temperature set at 350° C. and rotor speed at 15 rpm. When the polymer was molten 95 g of powdered boron nitride was added to the mixing bowl and the plunger lowered to force the powder into the melt. After the boron nitride appeared to be well distributed in the melt, the remainder of the polymer was added. The rotor speed was 15 rpm until the melt temperature reached 337° C. Rotor speed was then increased to 60 rpm for 5 minutes at which time the temperature was 348° C. The rotor was stopped and the blend removed from the mixer.

Invention Example 15

About 250 g of a 285 g charge of fluorinated TFE/PPVE copolymer H (3 weight percent PPVE, MFN=17.2) pellets was melted in the mixer with control temperature set at 350° C. and rotor speed at 15 rpm. When the polymer was molten 95 g of powdered boron nitride was added to the mixing bowl and the plunger lowered to force the powder into the melt. After the boron nitride appeared to be well distributed in the melt, the remainder of the polymer was added. The rotor speed was 15 rpm until the melt temperature reached 341° C. Rotor speed was then increased to 60 rpm for 5 minutes at which time the temperature was 346° C. The rotor was stopped and the blend removed from the mixer.

EMI SHIELDING EFFECTIVENESS EXAMPLES

Control Example 16

Hercules graphite fiber tow AS4-G-3K was coated in a wire coating cross head on a 3.8 cm (1.5 inch) Entwistle single screw extruder with an unfluorinated tetrafluoroethylene/perfluoro(propyl vinylether) copolymer I (3 weight percent PPVE and a MFN=25; for end group analysis see Table 5) to obtain a product with 27.4 weight percent fiber. The coated tow was cut into 3 mm (1.8 inch) pellets and injection molded into 13×13 cm (5×5 inch) plaques for testing. Due to some warpage of the injection molded plaques they were pressed just enough to flatten them out at 300° C. for about 5 minutes in the same press used to compression mold the electrically conducive compositions. They were then cooled in a non heated press. This treatment flattened them sufficiently for the shielding effectiveness measurement.

Invention Example 16

Hercules graphite fiber tow AS4-G-3K was coated in a wire coating cross head on a 3.8 cm (1.5 inch) Entwistle single screw extruder with a fluorinated tetrafluoroethylene/perfluoro(propyl vinyl ether) copolymer J (3 weight percent PPVE and a MFN=29; for end group analysis see Table 5) to obtain a product with 30.5 weight percent fiber. The coated tow was cut into 3 mm (⅛ inch) pellets and injection molded into 13×13 cm (5×5 inch) plaques for testing. Due to some warpage of the injection molded plaques they were pressed just enough to flatten them out at 300° C. for about five minutes in the same press used to compression mold the electrically conductive compositions. They were then cooled in a non heated press. This treatment flattened them sufficiently for the shielding effectiveness measurement.

Control Example 17

Hercules graphite fiber tow AS4-G-3K was coated in a wire coating cross head on a 3.8 cm (1.5 inch) Entwistle single screw extruder with an unfluorinated tetrafluoroethylene/perfluoro(propyl vinyl ether) copolymer I (3 weight percent PPVE and a MFN=25 to obtain a product with 21.1 weight percent fiber. The coated tow was cut into 3 mm (⅛ inch) pellets and injection molded into 13×13 cm (5×5 inch) plaques for testing. Due to some warpage of the injection molded plaques they were pressed just enough to flatten them out at 300° C. for about five minutes in the same press used to compression mold the electrically conductive compositions. They were then cooled in a non heated press. This treatment flattened them sufficiently for the shielding effectiveness measurement.

Invention Example 17

Hercules graphite fiber tow AS4-G-3K was coated in a wire coating cross head on a 3.8 cm (1.5 inch) Entwistle single screw extruder with a fluorinated tetrafluoroethylene/perfluoro(propyl vinyl ether) copolymer J (3 weight percent PPVE and a MFN=29 to obtain a product with 25 weight percent fiber. The coated tow was cut into 3 mm (⅛ inch) pellets and injection molded into 13×13 cm (5×5 inch) plaques for testing. Due to some warpage of the injection molded plaques they were pressed just enough to flatten them out at 300° C. for about five minutes in the same press used to compression mold the electrically conductive compositions. They were then cooled in a non heated press. This treatment flattened them sufficiently for the shielding effectiveness measurement.

Control Example 18

Hercules graphite fiber tow AS4-G-3K was coated in a wire coating cross head on a 3.8 cm (1.5 inch) Entwistle single screw extruder with an unfluorinated tetrafluoroethylene/perfluoro(propyl vinyl ether) copolymer I (3 weight percent PPVE and a MFN=25) to obtain a product with 14 weight percent fiber. The coated tow was cut into 3 mm (⅛ inch) pellets and injection molded into 13×13 cm (5×5 inch) plaques for testing. Due to some warpage of the injection molded plaques they were pressed just enough to flatten them out at 300° C. for about five minutes in the same press used to compression mold the electrically conductive compositions. They were then cooled in a non heated press. This treatment flattened them sufficiently for the shielding effectiveness measurement.

Invention Example 18

Hercules graphite fiber tow AS4-G-3K was coated in a wire coating cross head on a 3.8 cm (1.5 inch) Entwistle single screw extruder with a fluorinated tetrafluoroethylene/perfluoro(propyl vinyl ether) copolymer I (3 weight percent PPVE and a MFN=29) to obtain a product with 10 weight percent fiber. The coated tow was cut into 3 mm (⅛ inch) pellets and injection molded into 13×13 cm (5×5 inch) plaques for testing. Due to some warpage of the injection molded plaques they were pressed just enough to flatten them out at 300° C. for about five minutes in the same press used to compression mold the electrically conductive compositions. They were then cooled in a non heated press. This treatment flattened them sufficiently for the shielding effectiveness measurement.

DATA ANALYSIS

Data for thermal conductivity of the examples 14 and 15 are in Table 3. The results show that, surprisingly, the fluorinated compositions give higher thermal conductivity over the entire temperature range explored than the nonfluorinated compositions.

Figure 1:
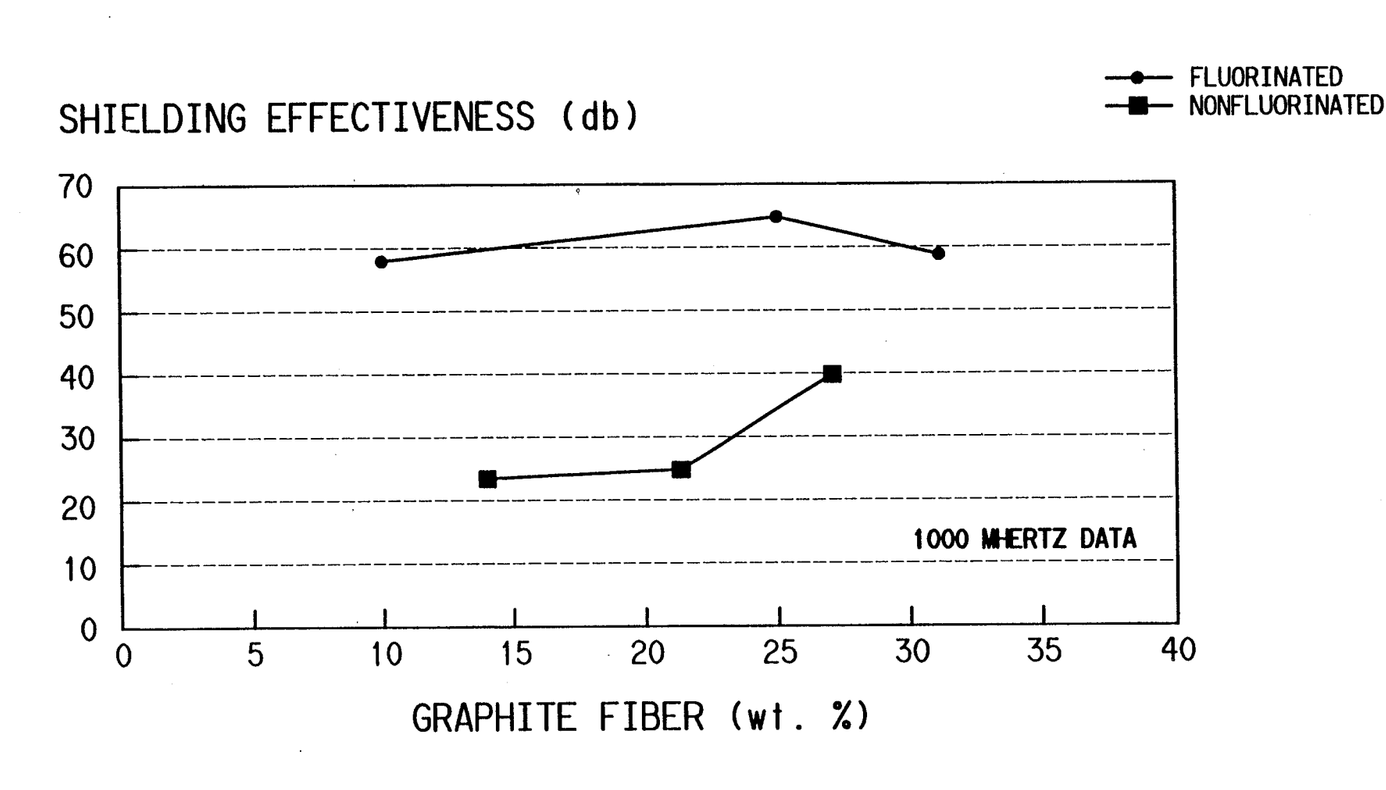
The FIGURE is a graphical representation of the performance characteristics of compositions of the present invention.

Data for the EMI shield effectiveness are tabulated in Table 4 and graphically illustrated for a frequency of 1000 MHertz in FIG. 1. The data in the table show that with only 10% graphite in fluorinated copolymer the attenuation is at least double that for a nonfluorinated composition with 14% fiber and significantly higher than that of a nonfluorinated composition with as much as 27% fiber. From the graph the surprisingly higher attenuation by the fluorinated based compositions is apparent.

Table 5 shows the end group analysis for the copolymers used as feedstocks for thermal conductivity and EMI shielding compositions.

TABLE 1

Resistivity and Melt Flow Number of Fluorinated TFE Copolymers of Controls and Examples

| Example | Carbon Black (wt %) | Carbon Type | Resistivity (ohm-cm) | Melt Flow Number (gm/10 min) |
|---|---|---|---|---|
| Control 1 | 4 | Ketjenblack DJ-600 | 4080.0 | 0.8 |
| Invention 1 | 4 | Ketjenblack DJ-600 | 4.5 | 5.97 |
| Control 2 | 2 | Ketjenblack DJ-600 | >10$^9$ | 0.49 |

TABLE 1-continued

Resistivity and Melt Flow Number of Fluorinated TFE Copolymers of Controls and Examples

| Example | Carbon Black (wt %) | Carbon Type | Resistivity (ohm-cm) | Melt Flow Number (gm/10 min) |
|---|---|---|---|---|
| Invention 2 | 2 | Ketjenblack DJ-600 | 434 | 0.89 |
| Control 3 | 2 | Ketjenblack DJ-600 | >10$^9$ | 5.1 |
| Invention 3 | 2 | Ketjenblack DJ-600 | 17.9 | 17.2 |
| Control 4 | 4 | Vulcan XC-72 | >10$^9$ | 3.59 |
| Invention 4 | 4 | Vulcan XC-72 | 95.5 | 12.1 |
| Control 5 | 4 | Black Pearls 2000 | 5.9 × 10$^8$ | 3.12 |
| Invention 5 | 4 | Black Pearls 2000 | 18.6 | 7.18 |
| Control 6 | 2 | Ketjenblack DJ-600 | 1450 | 3.5 |
| Invention 6 | 2 | Ketjenblack DJ-600 | 56 | 5.26 |
| Control 7 | 3 | Ketjenblack DJ-600 | 18.6 | 1.97 |
| Invention 7 | 3 | Ketjenblack DJ-600 | 12.2 | 2.78 |
| Control 8 | 7 | Vulcan XC-72 | >10$^9$ | 2.0 |
| Invention 8 | 7 | Vulcan XC-72 | 15.0 | 6.1 |
| Control 9 | 10 | Vulcan XC-72 | >10$^9$ | No flow |
| Invention 9 | 10 | Vulcan XC-72 | 5.2 | 8.7 |
| Control 10 | 20 | Vulcan XC-72 | 3.3 | No flow |
| Invention 10 | 20 | Vulcan XC-72 | 0.7 | No flow |
| Control 11 | 3 | Ketjenblack DJ-600 | 35.1 | 1.77 |
| Invention 11 | 3 | Ketjenblack DJ-600 | 11.3 | 4.4 |
| Control 12 | 3 | Ketjenblack DJ-600 | 35.1 | 1.77 |
| Invention 12 | 3 | Ketjenblack DJ-600 | 15.5 | 3.7 |
| Control 13 | 4.5 | Ketjenblack DJ-600 | 50.8 | 3.20 |
| Invention 13 | 4.5 | Ketjenblack DJ-600 | 3.7 | 4.25 |

Ketjenblack DJ-600 from Akzo - Noury Chemical
Vulcan XC-72 from Cabot Corporation
Black Pearls 2000 from Cabot Corporation

TABLE 2

| | | End Groups No./10$^6$ Carbons | | | |
|---|---|---|---|---|---|
| Polymer | | Acid Fluoride —COF | Carboxyl —CO$_2$H | Methyl Ester —CO$_2$CH$_3$ | Carbinol —CH$_2$OH |
| Copolymer A | Control | 28 | 12 | 10 | 84 |
| Copolymer A | Fluorinated | 0 | 0 | 0 | 0 |
| Copolymer B | Control | 52 | 22 | 8 | 0 |
| Copolymer B | Fluorinated | 0 | 0 | 0 | 0 |
| Copolymer C | Control | 41 | 31 | 15 | 97 |
| Copolymer C | Fluorinated | 0 | 0 | 0 | 0 |
| Copolymer E | Control | 16 | 31 | 12 | 150 |
| Copolymer E | Fluorinated | | | | |
| | o Example 11 | 25 | 10 | 0 | 0 |
| | o Example 12 | 48 | 8 | 0 | 0 |
| Copolymer F | Control | 115 | 63 | 0 | 0 |
| Copolymer F | Fluorinated | 0 | 0 | 0 | 0 |

TABLE 3

THERMAL CONDUCTIVITY OF CONTROLS AND INVENTION

| | ADDITIVE | MFN (g/10 min) | THERMAL CONDUCTIVITY (watts/m/deg K) | | |
|---|---|---|---|---|---|
| | | | 50° C. | 100° C. | 200° C. |
| Control example 14 | 25% Aluminum nitride | 6.8 | .42 | .39 | .36 |
| Invention Example 14 | 25% Aluminum nitride | 5.2 | .50 | .44 | .43 |
| Control example 15 | 25% Boron nitride | 8.8 | .50 | .48 | .47 |
| Invention Example 15 | 25% Boron nitride | 7.0 | .61 | .58 | .54 |

TABLE 4

EMI SHIELDING EFFECTIVENESS WITH GRAPHITE FIBER

| | GRAPHITE FIBER (wt %) | SAMPLE THICKNESS (mils) | SHIELDING EFFECTIVENESS IN dB | | | |
|---|---|---|---|---|---|---|
| | | | 30 MHz | 300 MHz | 1000 MHz | 1500 MHz |
| Control Example 16 | 27 | 112 | 57 | 40 | 40 | 44 |
| Invention example 16 | 31 | 118 | 60 | 60 | 59 | 58 |
| Control Example 17 | 21 | 113 | 39 | 26 | 25 | 28 |
| Invention example 17 | 25 | 110 | 63 | 63 | 65 | 61 |
| Control Example 18 | 14 | 112 | 31 | 20 | 24 | 22 |
| Invention example 18 | 10 | 101 | 61 | 54 | 58 | 58 |

TABLE 5

END GROUP ANALYSIS OF FLUORINATED AND NONFLUORINATED FEEDSTOCK

| POLYMER | END GROUPS-NUMBER PER 10 + 6 CARBONS | |
|---|---|---|
| | ACID FLUORIDE —COF | CARBOXYL —CO2H |
| THERMALLY CONDUCTIVE COMPOSITIONS | | |
| Copolymer G Control | 66 | 87 |
| Copolymer H Fluorinated | 0 | 0 |

TABLE 5-continued
END GROUP ANALYSIS OF FLUORINATED AND NONFLUORINATED FEEDSTOCK

| | END GROUPS-NUMBER PER 10 + 6 CARBONS | |
|---|---|---|
| POLYMER | ACID FLUORIDE —COF | CARBOXYL —CO2H |
| EMI SHIELDING COMPOSITIONS | | |
| Copolymer I Control | 88 | 60 |
| Copolymer J Fluorinated | 0 | 0 |

I claim:

1. A composition consisting essentially of
(a) 50-75 weight % of a melt-processible tetrafluoroethylene copolymer comprising recurring units of tetrafluoroethylene comonomer and recurring units of a comonomer represented by the formula wherein $R_1$ is $R_f$, —$R'_f$—X, or O—$R_f$ or —O—$R'_f$—X in which $R_f$ is a perfluoroalkyl radical of 1-12 carbon atoms, $R'_f$ is —$(CF_2)_n$—, where n=1-12, or the same diradical containing ether oxygen; and X is H or Cl; and wherein said copolymer has been fluorinated by subjecting it to a fluorinating agent until the number of unstable end groups is less than 70 per $10^6$ carbon atoms; and
(b) graphite fibers.

2. A composition consisting essentially of
(a) 50-90 weight % of a melt-processible tetrafluoroethylene copolymer comprising recurring units of tetrafluoroethylene comonomer and recurring units of a comonomer represented by the formula wherein $R_1$ is $R_f$, —$R'_f$—X, or O—$R_f$ or O—$R'_f$—X in which $R_f$ is a perfluoroalkyl radical of 1-12 carbon atoms, $R'_f$ is —$(CF_2)_n$—, where n=1-12, or the same diradical containing ether oxygen; and X is H or Cl; and wherein said copolymer has been fluorinated by subjecting it to a fluorinating agent until the number of unstable end groups is less than 70 per $10^6$ carbon atoms; and
(b) a thermoconductive filler.

3. The composition according to claim 1 or 2 wherein the comonomer is hexafluoropropylene.

4. The composition of claim 1 or 2 wherein the comonomer is perfluoro(propyl vinyl ether).

5. The composition of claim 1 or 2 wherein the comonomer is a mixture of hexafluoropropylene and perfluoro(alkyl vinyl ether).

6. The composition according to claim 1 or 2 wherein the fluorinating agent is fluorine gas.

7. The composition of claim 1 or 2 wherein the comonomer is a mixture of hexafluoropropylene and perfluoro (propyl vinyl ether).

8. The composition of claim 1 wherein the graphite fiber has an average length of at least 2 mm.

9. The composition of claim 1 wherein the graphite fiber has a length/diameter ratio of at least 100.

10. The composition of claim 1 or 2 wherein the amount of copolymer is 50-90% by weight.

11. The composition of claim 2 wherein the thermoconductive filler is selected from the group consisting of iron oxide, zinc oxide, aluminum oxide, magnesium oxide and silicon carbide.

* * * * *

UNITED STATES PATENT AND TRADEMARK OFFICE
CERTIFICATE OF CORRECTION

PATENT NO. : 5,000,875
DATED : Mar. 19, 1991
INVENTOR(S) : Robert Joseph Kolouch It is certified that error appears in the above-identified patent and that said Letters Patent is hereby corrected as shown below:

Claim 1, col. 19, line 26, change "50-75" to --50-95--.
Claim 11, col. 20, line 48, after "oxide" insert --aluminum nitride, boron nitrode--.

Signed and Sealed this

Ninth Day of August, 1994

Attest:

BRUCE LEHMAN

*Attesting Officer*   *Commissioner of Patents and Trademarks*